United States Patent Office 3,138,563
Patented June 23, 1964

3,138,563
FOAMABLE COMPOSITION COMPRISING A PHENOL ALDEHYDE RESOLE OR A CHLORINATED DIPHENYL OXIDE CONTAINING A COATED NEUTRALIZING AGENT
Willard L. Morgan, Newark, Ohio, and Charles A. Matuszak, Lawrence, Kans., assignors to Owens-Corning Fiberglas Corporation, Toledo, Ohio, a corporation of Delaware
No Drawing. Filed Apr. 3, 1961, Ser. No. 100,025
7 Claims. (Cl. 260—2.5)

This invention relates to compositions that are capable of producing substantially non-corrosive foams and to the process for producing the foams and the resulting product. More particularly, the invention relates to substantially non-corrosive, cellular, cured resin foams and resinous foamable compositions and processes for production of these foams in which a neutralization agent, a relatively dormant constituent thereof before foaming and curing of the resinous foamable compositions, after foaming and curing of the foams, serves to substantially neutralize residual constituents of the cured foams, which residual constituents if remaining unneutralized would render the foam corrosive. More particularly and in a specific instance it relates to a method whereby a cellular, expanded, infusible, thermoset, phenolic resin body, produced by the expansion and acid cure of a foamable composition containing a resole or partial condensation product of a phenol-aldehyde, alkaline catalyzed reaction, is rendered substantially non-corrosive by the incorporation, into the foamable composition, of a constituent adapted to effect at least substantial neutralization of residual acid remaining after foaming and cure of the composition, said constituent being one which is substantially inert with respect to the composition under conditions to which the composition is subjected prior to initiation of cure, but which is reactive under changed conditions prevailing at a time subsequent to initiation of cure to accomplish substantial neutralization as aforesaid.

Cellular, expanded, thermoset resin bodies, produced by the heating and acid cure of foamable compositions containing a resole or one stage phenolaldehyde resin have been known and would be useful in numerous and various applications, such as, insulation for refrigeration and home and industrial construction, and as a substitute for excelsior or similar packaging materials, just to mention a few, except that the cured foams are acidic in nature and corrosive. The acid curable resoles for use in such foamable compositions are conventionally produced by reacting phenolic compounds, such as, polyhydric phenols, phenol, amino phenols, and the like, with an excess of an aldehyde, such as, formaldehyde, alkylaldehydes, aryl-aldehydes, polyaldehydes, and the like, in the presence of an alkaline catalyst, e.g., sodium carbonate, sodium hydroxide, or potassium hydroxide. After the reaction has proceeded to a desired stage, generally by heating the starting materials at temperatures sufficient to maintain gentle boiling thereof, the alkaline catalyst in the reaction mixture is neutralized, and the neutralized resin then filtered and subjected to a vacuum distillation to remove water to a desired solids content. A foamable composition is then produced by mixing the resulting resole or acid curable phenol-aldehyde partial condensation product with an acid condensing or curing agent for the resole, such as, concentrated hydrochloric or phosphoric acid, a blowing agent, such as, diazoaminobenzene, and a wetting agent or surfactant, such as, sorbitan monolaurate. The foamable composition is then allowed to heat spontaneously or is heated to a temperature sufficient to cause foaming and cure of the composition and the production of a cellular, expanded, infusible, thermoset phenolic resin.

Because of the necessity of using a strong acid curing agent to produce satisfactory foams from a resole phenolic resin, and due to the fact that a residual curing agent is always present in the cured, expanded resin bodies, such bodies are highly corrosive in nature. This highly corrosive condition presents numerous difficulties and limitations in their use.

Foamed thermoset resin bodies also may be produced by polymerizing foamable resinous compositions containing monomers, such as those of the chlorinated diphenyl oxide type, where at least some of an acid evolved during the polymerization remain as a residual constituent in the resin bodies to render the cured bodies corrosive. For example, a foamable dichlorodimethyldiphenyl oxide resinous composition consisting essentially of about 60% of monomeric

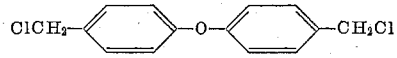

and about 40% of monomeric

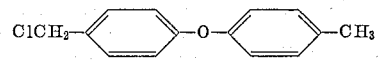

is curable by heating to an elevated temperature above about 80° C., generally about 135° C., in the presence of a small amount of a Friedel-Crafts catalyst, such as $AlCl_3$ or $MgCl_2$. Such resinous compositions also frequently contain minor amounts of dimers and trimers of the polymerizable constituents and may contain thickening agents of a fatty acid nature. During polymerization and curing, hydrochloric acid is evolved in substantial quantities. The evolved hydrochloric acid is effective as a blowing agent and also further catalyzes the polymerization. At least some of the evolved hydrochloric acid is entrapped in the cured, cellular foam to render the foam corrosive. In some instances about one-half of the evolved acid gas is entrapped in the polymeric foam. The usefulness of a foam formed from such a material is greatly enhanced if it is rendered substantially non-corrosive in the manner taught by the present invention.

In general, the invention provides highly useful, substantially non-corrosive foams and articles comprising these foams from those foamable resinous compositions therefore of little or no commercial utility because of the corrosive nature of the foams therefrom produced. The cured foams provided by the invention are extremely useful in the numerous and varied applications known to the art for cured substantially non-corrosive foams. To mention only a few, they are useful: as insulation for refrigeration, pipes and conduits, and home and industrial construction; as foamed in place potting materials to fill voids in boat hulls, electrical apparatus, and the like; as a substitute for excelsior and similar packaging materials; as buoyant fillers for fuel floats, life buoys, life saving jackets and the like; and as portions of various composite structural units useful as building components in the construction field.

It has now been discovered that a substantially non-corrosive foam can be produced from a foamable composition which would ordinarily produce an acidic foam by the addition to the foamable composition of a predetermined amount of a coated material, e.g., calcium oxide, lead oxide or iron oxide, adapted to at least substantially neutralize any residual acid remaining after foaming and cure of the composition. The material, which serves to neutralize residual acid, has a protective coating allowing substantially full foaming from evolved acid and substantially full curing from acid catalysts to be maintained during foaming and curing and delaying substantial neutralization until after the foaming and curing is substantially completed. Depending to a great part on the amount and nature of the neutralizing material, there are obtained cured foams that are substantially non-corrosive. The resulting cellular, expanded body is substantially neutral, i.e., has a pH from about 4½ to about 8, or alkaline, depending primarily upon the amount of neutralizing material added.

It is, therefore, an object of the invention to provide a foamable composition which would ordinarily cure to a corrosive acidic condition, but from which a substantially non-corrosive foam is produced.

It is a further object of the invention to provide a substantially non-corrosive, cellular, expanded, infusible resin body produced by the foaming and cure of a foamable, phenolic composition containing an acid curable, phenol-aldehyde partial condensation product.

Another object of the invention is to provide a method for producing a non-corrosive, cellular, expanded, resin body.

Other objects and advantages will in part be obvious, and will in part appear hereinafter.

For a better understanding of the nature and objects of the invention, reference should be had to the following detailed description.

A foamable composition of the invention comprises: A foamable resinous composition curable to a cured foam of corrosive properties due to a residual constituent in the cured foam; and a coated ingredient in an amount to effect substantially complete neutralization of the residual constituent, the coated ingredient substantially being inert with respect to the foamable resinous composition under conditions to which the composition is subjected prior to initiation of the cure, but reactive to neutralize the residual constituent under conditions prevailing at a time subsequent to initiation of the cure.

The foamable composition according to the invention, in a preferred instance, comprises: a resole or acid curable phenol-aldehyde partial condensation product; an acid condensing or curing agent for the phenol-aldehyde partial condensation product; at least one blowing agent; a wetting agent; and an amount of a constituent adapted to effect at least substantial neutralization of residual acid remaining after foaming and cure of the composition, said constituent being one which is substantially inert or dormant with respect to the composition under conditions to which the composition is subjected prior to initiation of cure, but which is reactive under changed conditions prevailing at a time subsequent to initiation of cure of the phenol-aldehyde partial condensation product to accomplish substantial neutralization as aforesaid.

Preferably, the foamable composition according to the invention generally comprises per 100 parts of an acid curable, phenol-aldehyde partial condensation product, about 5 parts to about 30 parts of an acid condensing agent for the phenol-aldehyde partial condensation product, about 2 parts to about 10 parts of at least one blowing agent, about 0.5 part to about 10 parts of a wetting agent, and an amount of particles of a metal compound, such as an oxide, carbonate or hydroxide of a metal preferably selected from the group consisting of calcium, barium, iron, strontium, radium, antimony, silver, mercury, and lead, adapted to effect at least substantial neutralization of residual acid condensing agent remaining after foaming and cure of the composition, the metal compound particles being coated with a protective material which renders them substantially inert and dormant with respect to the composition under conditions to which the composition is subjected prior to initiation of cure, but reactive under changed conditions prevailing at a time subsequent to initiation of cure of the phenol-aldehyde partial condensation product to accomplish substantial neutralization as aforesaid and to form, generally concomitantly with the production of a substantially non-corrosive, cured composition, a salt which may be considered as water insoluble and which is soluble in water to an extent not exceeding about 0.7 part in 100 parts.

The identity of the resole or acid curable phenol-aldehyde partial condensation product for use in foamable compositions according to the invention is relatively unimportant, so long as the resole is one which is curable to a thermoset condition and can be incorporated into a foamable composition by a desired technique. The most common suitable resoles are water soluble, alkaline catalyzed, fusible products of reaction of phenol and formaldehyde in ratios of from about 1 mol to about 2.5 mols of the latter per mol of the former. A detailed discussion of resoles can be found in The Chemistry of Phenolic Resins, Robert W. Martin, John Wylie & Sons, Inc., New York, New York, 1956 (see, in particular, pages 88 to 98, 117–122, 146–152, and cited references).

As has been indicated above, a foamable composition according to the invention also includes an acid condensing agent for the acid curable, phenol-aldehyde partial condensation product. Sulfuric acid and hydrochloric acid are especially suitable acid condensing agents for use in compositions according to the invention. However, any other strong acid or acid substance capable of effecting rapid cure of the phenol-aldehyde partial condensation product may be used, e.g., urea hydrochloride, phosphoric acid, dimethyl sulfate, acetyl chloride, p-toluene-sulfonic acid, phenol sulfonic acid, and other sulfonic acids. The particular identity of the preferred acid condensing agent will depend to some extent upon the material selected to neutralize the acid condensing agent, and vice versa, as will be subsequently explained in detail.

The spontaneous heat generated when a resole phenolic resin and a strong acid providing a hydrogen ion or pH value in the 0.5 to 3 range are brought together is the basis of foaming such resins. The curing of polymerization of the phenolic resin liberates heat which accelerates such curing and heat generation. Such masses within a few minutes arrive at elevated temperatures limited by the total mass to be heated and by the boiling of any liquids present such as water or diethyl ether. If a heat decomposable material providing a gas such as carbon dioxide or nitrogen or a heat vaporizable substance as water or diethyl ether is present the gas phases formed act to distend and foam the still soft resin. However, curing increases the resin viscosity quickly with time and sets the mass to the final foam. Weak acids do not provide heat fast enough to form other than dense foams. Hence strong acid in quantity is necessary and the invention avoids neutralizing such acid until after the foam is made. Without the protective coatings applied on the neutralizing bodies such materials quickly react with the strong acid catalysts and either prevent foaming or enable only slight foaming attended with soft undercured residual properties.

The identity of the blowing agent or agents for use in the foamable compositions is relatively unimportant. Any blowing agent used must be comparatively stable at temperatures below and often comparatively near the temperature range within which the resinous constituents of the compositions polymerize and cure rapidly, and must vaporize and/or decompose and form a gaseous product at the temperatures encountered during the desired curing reaction, but before cure is effected. It will be appreciated that any of the many known blowing agents can be used for this purpose, so long as their vaporization and/or decomposition occur at temperatures which are appropriate for the particular composition being foamed. For acid curable phenol-aldehyde partial condensation products such temperatures are generally within the range of about 65° C. to about 250° C. Examples of suitable blowing agents that may be used in foamable resinous compositions according to the invention are indicated in the following table:

| Blowing agent: | Effective temperature range, °C. |
| --- | --- |
| Azobisisobutyronitrile | 105–120 |
| Azo dicarbonamide 1,1-azobisformamide | 100–200 |
| Benzenesulfonyl hydrazide | 95–100 |
| N,N' - dinitroso - N,N' - dimethylterephthalamide | 65–130 |
| Dinitrosopentamethylene tetramine | 130–190 |
| Ammonium carbonate | 58 |
| P,P'-oxybis-(benzenesulfonyl hydrazide) | 100–200 |
| Diazoaminobenzene | 84 |
| Urea-biuret mixture | 90–140 |
| 2,2'-azo-isobutyro-nitrile | 90–140 |
| Azo-hexahydrobenzo-nitrile | 90–140 |
| 4,4'-diphenyl disulfonylazide | 110–130 |
| Diisobutylene | 103 |
| Isopropyl ether | 68 |

As has been stated previously, a foamable composition according to the invention may also include a wetting agent. While excellent higher density foam may be made without such materials, it has been found that the use of a wetting agent has a noteworthy effect upon the compressive strength of the cured foam which is produced. In addition, the wetting agent has a marked effect upon cell size and the ability of a composition to expand, enabling the production of cured, low density foams composed of a plurality of small and comparatively uniform cells. In general, any wetting agent or sufactant which is effective with a particular resole may be employed in the foamable compositions according to the invention. For example, polyoxyethylated vegetable oils, polyoxyethylated sorbitan monopalmitate, polyoxyethylene sorbitan monolaurate, n-alkyl trimethyl ammonium chlorides, dialkyl dimethyl ammonium chlorides, polyoxyethylene sorbitan monooleate, stearyl dimethyl benzyl ammonium chloride, alkyl imidazolinium chlorides, nonylphenoxy polyoxyethylene ethanol, ammonium alkylphenoxy polyoxyethylene sulfates, polyoxyethylene, glycol esters of fatty acids, tertiary amines, ethylene oxide condensation products of primary fatty amines, polyethylene glycol fatty esters and polyethylene glycol esters of oleic acid, just to mention a few, are suitable wetting agents for use in foamable compositions according to the invention.

As has also been indicated previously, a foamable composition according to the invention also includes an amount of a constituent adapted to effect at least substantial neutralization of residual acid remaining after foaming and cure of the composition. In order for a material to be capable of producing the above recited desired result, it has been found that the material must meet certain essential requirements. First, of course, the material must be one that is capable of neutralizing the particular acid. In other words, the neutralizing material should be a metal compound readily capable of reaction with residual acid which remains in the cured foam after foaming and curing of the resinous foamable composition. The reaction should form a salt or product which is less corrosive than the acid and desirably substantially non-corrosive when present as a filler or bulking agent in the cured foam. In general, the cations of the metal compound, upon reaction with the residual acid, yield a salt, desirably a substantially water insoluble salt. Sulfuric acid gives particularly excellent results as the acid condensing agent, although various other acids, such as p-toulene sulfonic acid, phenol sulfonic acid, benzene sulfonic acid, and hydrochloric acid, have been used as acid condensing agents in foamable phenolic resole compositions. Numerous metal compounds, such as the oxides, hydroxides, and carbonates of alkaline earth metals and alkali metals, are capable of neutralizing these acids and forming salts which in the cured foam are substantially non-corrosive or at least less corrosive than the acids. For example, silver oxide can be successfully used as the neutralizing material in foamable compositions to neutralize residual hydrochloric acid used as the condensing agent and calcium oxide is particularly useful when residual sulfuric acid is to be neutralized. Preferably, the salts or products of the neutralizing reaction are substantially insoluble in water, so that they do not appreciably affect oxidative or electrolytic or ionic corrosion. In this respect, it is preferable that the salts also be insoluble in any non-electrolyte which may remain after foaming and cure of the composition. It should be understood that the salts formed as a result of the neutralization reaction may be water soluble to some extent. In this respect, it is only necessary that such salts be substantially water insoluble. For example, solubilities up to an extent not exceeding 0.7 part in 100 parts of water can be tolerated.

Still another requirement of the material is that it be substantially inert with respect to the other constituents of the foamable resinous composition, e.g. the acid condensing agent, prior to initiation of cure of the resole. It will be appreciated that if the material were not so adapted, neutralization of the acid condensing agent would occur immediately upon mixing of the composition, with the subsequent result that desired cure of the phenol-aldehyde partial condensation product would be rendered impossible.

Finally, the material must be adapted in such a manner that although it is substantially inert prior to initiation of curse, it is reactive under changed conditions prevailing at a time subsequent to initiation of cure to accomplish neutralization of the residual acid condensing agent with little or no damage to the completed cured foam itself.

One group of materials that have been found to be particularly effective in rendering foamed resin bodies of the type described substantially non-corrosive are metal compounds, such as metal oxides which form, by reaction with the residual acid constituent, salts that are substantially insoluble. These oxides are provided with a coating of a material or compound that is insoluble in aqueous acid resin mixes but is removed at temperatures encountered subsequent to initiation of cure of the phenol-aldehyde partial condensation product. The coating encapsulates the neutralization material under conditions prevailing prior to initiation of cure and thus effectively avoids substantial neutralization of the acid prior to initiation of cure. The coating dissipates under conditions prevailing subsequent to initiation of cure, thus enabling neutralization of the residual acid to occur.

Excellent results have been obtained when using foamable compositions containing sulfuric acid as the curing agent by the incorporation therein of particles of calcium, barium or strontium oxide coated with a high molecular weight fatty acid, such as oleic acid, a coconut fatty acid, stearic acid, or the like, which is effective to form, by reaction therewith, insoluble metal soap envelopes. Such an insoluble soap can also be formed by a similar reaction between the oxide and 2-ethylhexoic acid, or the like.

Besides the alkaline-earth metal oxides mentioned above, antimony oxide, silver oxide, magnesium oxide, zinc oxide, mercuric oxide, iron oxide, and lead oxide, all have been found to be particularly well suited for use with compositions employing an acid catalyst or containing or forming a residual and constituent, such as hydrochloric acid or the like.

In addition to the oxides of metals which form substantially water insoluble salts with the acid condensing agent, various other compounds of such metals may be effectively utilized in the foamable compositions according to the invention. For example, good results have been obtained when using the hydroxides and carbonates of antimony, silver, calcium, strontium, barium, lead, and the like.

As previously mentioned, in order to render a metal compound, such as the metal oxides, carbonates, hydroxides, and the like, effective to neutralize the residual acid remaining after foaming and cure of the foamable composition, such compounds must be protected in such a manner that no reaction will take place between them and the acid before foaming and cure has taken place. Besides materials that will form a coating by reaction with the metal oxides, hydroxides, carbonates and the like (such as high molecular weight, fatty acids, and other organic acids, such as benzoic acid, phthalic acid, maleic acid, oxalic acid, or the like), various other non-active coating materials may be successfully employed, such as paraffin wax, beeswax, naphthalene, petroleum jelly, camphor, ozokerite, asphalt, pitches, carnauba wax, polyethylene oxide waxes, and the like. It has been found that these materials supply effective protection against reaction of the neutralizing material with the acid under conditions to which the composition is subjected prior to initiation of cure, but melt and/or otherwise thermably disperse in the composition so that neutralization occurs at temperatures encountered after initiation of cure either due to the spontaneous heating during foaming and curing or due to deliberate heating. Care should be used in selection of a particular protective coating substance for the particles of neutralization material in that changed conditions prevailing at conditions subsequent to initiation of cure must be of a nature and magnitude so as to dissipate the particular protective coating substance. For example, when employing pure calcium stearate as the protective coating material, if the temperatures during curing do not reach or closely approach the melting point of calcium stearate, it is necessary to deliberately heat the foam to a temperature sufficient to dissipate the calcium stearate, thus enabling neutralization of residual acid to take place.

The quantity of neutralizing material added to the foamable composition may vary within substantial limits, a definite satisfactory numerical or proportionate range being extremely difficult of definition. Acid catalysts provide resole foams of 0.5 to 3 pH when no neutralization is used. In attempting to define a lower limit, it is only necessary to include an amount of neutralizing material that is effective to at least substantially neutralize residual acid remaining after foaming and cure of the composition. In this respect, phenolic resole foams having a pH from about 4½ to about 8 have been found to possess excellent noncorrosive properties, while satisfactory results have been obtained when the pH is in the range of about 4.5 to about 11. The proportion of neutralizing material employed should, therefore, be such that a pH within the indicated ranges results after reaction thereof with the acid condensing agent. With MgO as a neutralizing material for residual hydrochloric acid, the amounts thereof employed may be in excess of that necessary to completely neutralize residual hydrochloric acid so that excess MgO will be available to react with the resulting neutralization salt, $MgCl_2$, to form the well known magnesium oxychloride compounds or cements, which remain in the cured foam as a filler or bulking agent. Similarly with ZnO, the employed proportions thereof may be such as to form the similar so-called basic neutral zinc oxychloride compounds or cements. Otherwise, the use of excessive amounts of neutralizing material or inert materials generally is avoided. Desirably only an amount of neutralizing material sufficient to neutralize is employed, as greater amounts have caused the foams to become slower curing, and have greatly increased the tendency of their shrinking due to failure of the spontaneous heat generated carrying the mass to 95–100° C. and securing complete cure.

Only enough coating material need be employed to provide essentially complete envelopment of the particles of neutralizing material with a protective coating of either of the types described. For example, when using about 3 percent to about 6.5 percent of metal oxide particles, based upon the total weight of the composition, good results have been obtained with metal oxide particles coated with approximately 4 percent of either stearic acid or paraffin wax, based upon the weight of the mixture of calcium oxide and stearic acid or paraffin wax, respectively. Under most circumstances, the amount of coating should be from about 2 percent to about 6 percent of the weight of neutralizing material and coating. This amount of coating material generally is satisfactory, although some alteration in amount is desirable when using large amounts of coarse and extremely fine particles of neutralization material. With large amounts of extremely fine particles, such as of a submicron size, somewhat larger amounts of coating material should be used to provide sufficient coating for increased surface area due to the multitude of fine particles and thus avoid a premature neutralization reaction prior to initiation of cure. The neutralization material is employed in a particulate state, and generally as a mixture of particle sizes with extremely fine and coarse particles avoided or at least limited to a minor proportion of the mixture. Desirably all particles are of a −100 mesh size with −140 mesh size particles being preferred. Large amounts of coarse particles, such as larger than about −100 mesh, are not desirable, even though a somewhat smaller amount of coating material will suffice to coat these coarse particles. Large amounts of coarse particles may deleteriously affect the physical properties of the cured foam and, after initiation of the cure, have a tendency to retard and slow completion of the neutralization reaction.

The term "percent" and "parts" are used herein, and in the appended claims, to refer to percent and parts by weight, unless otherwise indicated. Where mesh or sieve sizes are used herein, unless otherwise indicated, they refer to U.S. Sieve Series, U.S. Bureau of Standards.

Any suitable method of coating the neutralizing material may be employed. A simple and preferred method of coating is to ball mill the neutralizing material in the presence of the protective coating substance for a period of time sufficient to form envelopes of the coating substance about particles of the neutralizing material. For example, calcium oxide particles have successfully been provided with a protective coating by ball milling at normal room temperature the calcium oxide in the presence of stearic acid for about 4 to 8 hours. Frictional action of the particles against each other appears to cause a local heating and a melting on the surface of the particles without requirement for the presence of water. The result is that every particle is provided with a coating of calcium stearate. Other methods for coating the neutralizing material also are useful. The surfaces of the particles can be thoroughly wet, as by dipping or spraying, with a solvent solution of the coating material and then the solvent evaporated to leave a coating on the surfaces of the particles of neutralizing material. For example, particles of calcium oxide can be wetted with a benzene solution of petroleum jelly to provide, after evaporation of the benzene from the wetted particles, a thin coating of petroleum jelly. Other known coating techniques also may be employed.

According to a preferred method for producing the cellular, expanded, infusible resin bodies of the invention, a basic resin mix of a phenol-aldehyde partial condensation product, a wetting agent and a blowing agent, is prepared and placed in a storage vessel maintained at a temperature of about 40° C.

Coated particles of a neutralizing material are then added to the basic mix, and the resulting mixture is fed into one of two inlets to a fast acting bladed mixer while a required predetermined quantity of an acid condensing agent is fed to the other inlet. A uniform dispersion of the phenol-aldehyde partial condensation product, wetting agent, blowing agent, coated neutralizing particles and acid condensing agent is discharged from the mixer. A predetermined amount of the resulting dispersion is then placed in a suitable mold and allowed to heat spontaneously to about 100° C. or it may be heated to a temperature within the range of approximately 40° C. to 150° C. for a period of time, such as, 5 to 15 minutes, sufficient that cure of the composition is complete. The composition will foam and cure spontaneously, e.g., from a cup, within the same time where about 1 to 2 minutes induction time permits mold loading.

Preferably, the cured phenolic foam is then heated to a temperature sufficient to assure that the coating material, or compound thereof formed with the neutralizing material, will melt and/or diffuse into the body of the foam, thereby exposing the neutralizing material to the action of the residual strong acid condensing agent. This is generally accomplished by short time heating to a temperature within the range of 90° C. to 150° C., the precise temperature being dependent upon the decomposition, vaporization, or melting temperature of the particular coating compound or material. The foams then become substantially neutral in nature, the final pH depending upon the mol ratio of the neutralizing material reacted with the acid employed, as well as the identity of the reaction product. The salts formed as a result of the neutralization reaction, such as the sulfates and chlorides of calcium, barium, silver, lead, and the like, merely serve as bulking agents for the foam, and in no respect have been found to be detrimental thereto.

It has been found that drying or post-baking the foams, although not absolutely necessary to produce substantially non-corrosive resin bodies, is preferred in order to obtain the least corrosive foamed or cellular bodies. Drying times of about 12 to 24 hours at approximately 105° C. generally have proved excellent in this respect. It should further be noted that the drying or post-baking period while desirable for water removal may be utilized for decomposing, dispersing, or otherwise removing the protective coating, thereby eliminating any need for a separate heating step for this purpose.

The corrosion test method used in determining the corrosiveness of the various foams was very similar to the test of Commercial Standards No. CS-131-46III (1946, U.S. Department of Commerce, National Bureau of Standards) and was run according to the following procedure. A foam-metal-foam sandwich was prepared with a strip of each of the following three metals: polished aluminum, polished copper, and cleaned cold rolled steel. The sandwiches were held together with rubber bands to assure good contact of the metal with the foam being tested. The three sandwiches for each foam were placed on a porous plate resting about one-half way down in a clean casserole dish. In the bottom of the casserole dish was placed approximately 150 ml. of distilled water. A second casserole dish was inverted over the lower casserole dish containing the water and test samples. The junction between the two casserole dishes was sealed with electrician's tape. The casserole dishes were placed in an oven set at 115–120° F. for approximately 96 hours. Thus, the test samples are subjected to a high temperature and high humidity environment. By this test, even if the foam samples are inert, control copper strips are somewhat discolored, control aluminum strips are unaffected, and control cold rolled steel strips are somewhat rusted or corroded. Cold rolled steel is very sensitive to corrosion by this test method.

The following examples illustrate the present invention:

EXAMPLE 1

A foamable composition according to the invention was produced from a particular dispersion of a phenol-formaldehyde partial condensation product which is hereinafter referred to as "Resin A" and is subsequently identified in detail. A dispersion was produced from 100 grams of Resin A, 4 grams of a polyoxyethylene sorbitan monopalmitate having about 20 oxyethylene groups per mol of sorbitan monopalmitate (such as "Tween 40," sold by the Atlas Powder Co.), 4 grams of diazoaminobenzene, and 5.5 grams of stearate coated, calcium oxide particles.[1] This dispersion was placed in a storage vessel, and heated to a temperature of substantially 40° C. The dispersion and 20 grams of sulfuric acid (50 percent $H_2SO_4$—50 percent $H_2O$) were then mixed thoroughly in a pump-type, fast acting, bladed mixer. A uniform dispersion of Resin A, polyoxyethylene sorbitan monopalmitate, diazoaminobenzene, stearate coated calcium oxide particles and sulfuric acid was discharged from the pump-type mixer. The uniform dispersion was then charged into an open-topped, right parallelepipedal mold. The vertical sides of the mold were approximately 2 inches high, and the rectangular base was approximately 15 inches x 15 inches, and was heated to 93° C. A cover heated to 121° C. was then placed over the mold to enclose the foamable composition therein, except for about 30 small vent holes approximately 1/8 inch in diameter. Prior to introduction of the foamable composition into the mold, the interior walls thereof, and the interior wall of the upper platen, had been coated with a commercially available silicone grease to prevent sticking of the cured foam. After approximately 10 minutes in an oven at about 100° C. the mold and the cover were removed and a tough cured phenolic foam was withdrawn from the mold. The foam then was placed in a drying oven heated to a temperature of about 105° C. for a period of approximately 24 hours. After removal from the oven and cooling to room temperature, the foam was examined, and was found to have an apparent density of substantially 1.75 pounds per cubic foot and an average cell size of about 4.5 mils. The interior of the foam had a compressive strength of from 9.4 to 7 pounds per square foot at 10% deformation and a K value of about 0.23 B.t.u. per hour per square foot per degree Fahrenheit per inch of thickness. It also had an attractive light yellow color in contrast to similar foams made without the calcium oxide which were a brownish red grey shade.

A pH study was made of the dried foam by grinding 2 grams of the foam into small particles, and adding the pulverized foam to 100 ml. of boiled distilled water. The pH was found to be 10.3, as measured by a pH meter. The amount of treated calcium oxide employed in this example was about the chemical molar amount to neutralize all the sulfuric acid. The mildly alkaline final nature of the foam shows that the acid was neutralized since a comparable foam without the treated calcium oxide would have shown a strongly acid hydrogen ion value of 2 to 3 and would have been very corrosive to aluminum and steel and slightly corrosive to copper.

On making the corrosion test with the foam, thus produced in accordance with the invention, the copper and aluminum were found to be unaffected and the bright cold rolled steel was generally not corroded except for some small spots similar in number and condition to another piece of the cold rolled steel carried through the same test without contact with any foam but water spotted during the test condensation. This contrasts to the almost rusted through condition that happens in the same test with the acid catalyzed foams described just above where the neutralizers of the invention were not employed.

Resin A was produced from 66.6 parts of formaldehyde, added as 37 percent formalin, 100 parts of phenol and 4 parts of sodium hydroxide. The starting materials were mixed in a suitable vessel, allowed to stand at room temperature (about 25° C.) for approximately 16 hours, and heated at a progressively increasing temperature which was sufficient to maintain gentle boiling thereof. Heating was discontinued when the temperature of the reaction mixture reached approximately 85° C. The

---

[1] The coated calcium oxide particles were prepared by ball milling, at an ambient temperature of about 70° F., a mixture of 100 parts of CaO particles of less than −140 mesh and 4 parts of stearic acid for approximately 8 hours.

sodium hydroxide in the reaction mixture was then neutralized with phosphoric acid, and the neutralized resin was filtered. The filtered resin was then subjected to a vacuum distillation to remove water to a solids content of 76.2 percent.

In determining solids content of Resin A, a weighed portion thereof was heated to 300° F. for two hours, and the final weight of the resin portion was determined. Solids content, in percent, was considered to be 100 times the final weight divided by the initial weight.

Resin A was found to contain 5.1 percent of free formaldehyde, and to have a viscosity of 1600 centipoises at 40° C. The free formaldehyde determination was based upon resin solids, and was calculated to be 100 times the weight of free formaldehyde found in a sample of the resin divided by the weight of resin solids in the sample. Weight of the resin solids was calculated by multiplying 1/100 of percent solids (0.762) times the sample weight.

The same method, using the same basic resin mix and oven after treatment as recited in Example 1, but with varying amounts of stearate coated calcium oxide particles, was employed to produce a series of foam mixes. Each mix was catalyzed with 20 grams of 50 percent sulfuric acid. Each mix foamed normally and the results of tests on the various foams are given in the following table:

Table I

| Sample No. | No. of Grams of Stearate Coated, CaO Added | Mols of CaO per Mol of $H_2SO_4$ | pH | Color |
|---|---|---|---|---|
| 1 | 0 | 0 | 2.0 | Grey Brown |
| 2 | 4.0 | 0.71 | 3.7 | Red Brown. |
| 3 | 4.5 | 0.8 | 3.3 | Do. |
| 4 | 5.0 | 0.9 | 4.2 | Do. |
| 5 | 5.25 | 0.94 | 10.8 | Light Yellow. |
| 6 | 6.0 | 1.07 | 10.5 | Do. |
| 7 | 7.0 | 1.25 | 10.5 | Do. |
| 8 | 8.0 | 1.43 | 10.5 | Do. |

The foams produced varied from 1.75 to 2.5 lbs. per cubic foot as was normal to these foams generally. The corrosion test [2] for sample No. 1 was very bad as stated under Example 1. While progressively less attack was found with samples 2 and 3, these were still very corrosive to steel and aluminum and slight in attack on copper. Sample 4 was still active on aluminum and steel to a lesser degree and not active on copper.

The samples 5 to 8 which were alkaline all gave excellent corrosion results like Example 1 described above. It will be noted that somewhat less than the usul 2 mols of CaO per 1 of sulfuric acid resulted in the foams becoming alkaline. This may result because some aniline may be formed in the decomposition of the diazoaminobenzene foaming agent.

As can be observed from the results shown in Table 1, although the foams containing more than about 5.0 grams of stearate coated, calcium oxide particles were alkaline in nature, no substantially neutral foam (pH of approximately 4.5 to 8) was obtained since the slightest excess of calcium oxide immediately gives its normal hydrogen ion value.

It has also been discovered that, by the addition of a buffering agent, e.g., phosphoric acid or phosphate salts, or other weak acids or their salts, to the foamable composition, substantially neutral foams can be obtained. Excellent results have been obtained when using about 2 to about 10 percent of a buffering agent, based upon the weight of the mixture of acid condensing agent and blowing agent. While various other weak acids or their salts may be used it is preferable that such acid bodies be chosen to provide a substantially insoluble salt or only slightly soluble salt with the metal compound comprising the neutralizing means. Thus where calcium oxide is employed the phosphoric acid or phosphate could be replaced by boric acid or a borate or by phthalic acid or a phthalate. In some applications the buffering agent may be readily incorporated by serving at least in part as the protective coating substance for the metal compound.

EXAMPLE 2

The same method, using the same basic resin mix as recited in Example 1, but with varying amounts of stearate coated, calcium oxide particles, was employed to produce a series of foam mixes. However, each foamable mix was, in this instance, buffered by the addition of 2 grams of phosphoric acid, calculated as $H_3PO_4$, to 20 grams of the 50 percent sulfuric acid condensing agent. The results of pH and corrosion test determination appear in the following table:

Table II

| Sample No. | No. of Grams of Stearate Coated, CaO Added | Mols of CaO per Total Acid Equivalent | pH |
|---|---|---|---|
| 11 | 6.5 | 1 | 4.4 |
| 12 | 6.9 | 1.07 | 4.4 |
| 13 | 7.2 | 1.11 | 5.6 |
| 14 | 7.5 | 1.16 | 6.1 |
| 15 | 7.8 | 1.21 | 6.8 |
| 16 | 8.1 | 1.25 | 7.5 |
| 17 | 8.4 | 1.30 | 10.9 |
| 18 | 8.7 | 1.35 | 10.2 |
| 19 | 9.0 | 1.40 | 10.2 |

Corrosion results with samples 11 and 12 were better than sample 4 of Table I but showed some action on aluminum and copper. All the other samples were very much improved over these and were better than any of the samples in Table I. Samples 14, 15, and 16 were without any notable corrosive action on the three metals being better than a blank test with no foam on steel where water condensed and spotted the steel.

Even though improved corrosion results were provided in each of samples 11–19, there apparently was employed in samples 11, 12, and 13 insufficient stearate-coated CaO to effect complete neutralization of the residual acid and in samples 17, 18, and 19 insufficient buffering agent to realize substantial buffering action. The method by which samples 14, 15, and 16 were produced constitutes the best presently known mode for practicing the instant invention.

It should be noted that the foams produced from the compositions containing a buffering agent show some improvement in corrosion properties with the very sensitive black iron when subjected to the previously described corrosion tests, over the alkaline foams produced from the non-buffered compositions. For many applications where water might come in contact with the foams and then run off onto corrodible materials, these buffered neutral foams should have added advantage.

In these foams the acids present as catalysts were changed in the final foams to the relatively insoluble calcium sulfate and calcium phosphates. Any water extractable material thus was substantially free of salt-like or ionized material and at most contained traces of phosphates which coat steel with insoluble iron phosphates and slow the corrosion of such as compared with pure water.

The non-reactivity of the catalyst acids with the coated protected calcium oxide is shown by the general lack of any difference in curing rate and foaming rate of the phenolic foamable mixes with or without the oxide being present in the quantities indicated. Likewise the hydrogen ion value immediately after foaming and curing will fall for the foams made in Table II in the range of 2.7 to 3.0 the same as similar foams made without the oxide. With the passage of a day or two these pH values climb upwards showing neutralization is proceeding. The final

---

[2] As determined by the procedure similar to test of Commercial Standards No. CS-131-46III.

hydrogen values may be quickly attained by heating the foam as already stated to temperatures above 100° C.

EXAMPLE 3

One hundred gram portions of calcium oxide particles were added to three, 250 ml. solutions of benzene, containing, respectively, 4 grams of the following materials: petroleum jelly, benzoic acid, and 2-ethylhexanoic acid. The benzene in each of the three dispersions was then evaporated in a hood. A 7 gram portion of the CaO particles coated with petroleum jelly was then added to the basic resin mix of Example 1. Two other foams were then prepared in the same manner, but substituting 7 gram portions of the benzoic acid coated CaO particles and the 2-ethylhexanoic acid coated CaO particles, respectively, for the petroleum jelly coated CaO particles. Results of a pH study and corrosion tests on the three foams are given in the following table:

Table III

| Sample No. | Coating Material | pH |
| --- | --- | --- |
| 20 | Petroleum Jelly | 9.8 |
| 21 | Benzoic acid | 10.5 |
| 22 | 2-ethylhexanoic acid | 10.5 |

The corrosion results of samples 20–22 were much like those of samples 5 to 8 in Table 1.

EXAMPLE 4

To a 100 gram portion of an equal mixture of two resol phenolic resins, manufactured by Bakelite Division of Union Carbide and Carbon, designated as BRL 2759 and BRL 2760 and of a formaldehyde to phenol ratio of about 1.3:1 providing a maximum amount of exothermic heat per gram on curing and foaming, there was added 2 grams of the polyoxyethylene sorbitan monopalmitate used in Example 1 and 13 grams of di-isopropyl ether as a foaming agent. Into this mixture there was stirred 35 grams of lead oxide powder which had been ballmilled with 3 grams stearic acid for several hours. To this mixture there was quickly stirred in a premade mix of 10 cubic centimeters of concentrated hydrochloric acid, 10 grams of urea and 10 cc. of water. This catalyst mixture of urea hydrochloride and hydrochloric acid caused rapid foaming and curing within approximately ten minutes. The highly acid foam of hydrogen ion value about 1.5 was then heated 24 hours at 105° C. to give a neutral foam of pH 6 to 8 in which the hydrochloric acid was tied up as the relatively insoluble lead chloride.

EXAMPLE 5

Finely ground magnesium oxide particles (−140 mesh size) were ball milled in the presence of small pieces of refined carnauba wax at a temperature of about 35° C. until magnesium oxide particles coated with about 7% carnauba wax were obtained. A mixture was prepared from forty parts of the wax-coated, magnesium oxide particles, 1 part of $MgCl_2$ as a catalyst and 275 parts of a chlorinated diphenyl oxide polymerizable foamable resinous composition. The diphenyl oxide consisted essentially of about 60% of monomeric.

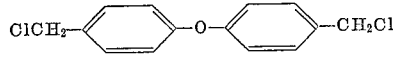

and 40% of monomeric

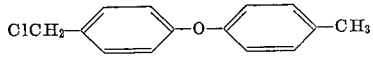

The resulting composition was then cured at about 90° C. for a time sufficient to foam and cure the composition, about 20 minutes, in an open-topped, acid-resistant-metal mold provided with a means for collection and removal of evolved hydrochloric acid gas.

The resulting cured product then was removed from the mold, examined, and found to be a cured foam product. A pH determination was made of the cured foam by grinding a 2 gram portion of the foam into small particles and adding the ground foam to 100 ml. of distilled water. The pH thereof was about 10. When the chlorinated diphenyl oxide polymerizable foamable resinous composition was cured by the $MgCl_2$ catalyst without the coated MgO being preesnt, a cured foam of like density was obtained, only the foam was strongly acidic and corrosive, as shown by the pH thereof being less than 3.

Similar results were obtained when using particles of metal carbonates and metal hydroxides coated with a protective material of one of the types previously described. With the metal carbonates the results were not as good as those secured when utilizing metal oxide or metal hydroxide particles, although substantial success was achieved. It is believed that small amounts of the metal carbonate reacted to some extent with the acid condensing agent before and during foaming and cure of the compositions. Improved results are secured if larger amounts of protective coatings are employed for the metal carbonates. The gas evolved by the reaction probably caused some of the protective coating to be blown off. Such a premature reaction is, of course, undesirable, since it makes mixing difficult and curing slow. However, in all cases the final foams did have improved corrosion properties.

Although the present invention has been described only in connection with foamable compositions containing an acid curable, phenol-aldehyde partial condensation product and a chlorinated diphenyl oxide polymerizable foamable resinous composition, it is apparent that other foamable, curable resinous binders, requiring neutralization of residual acid constituents, may be subtsituted therefor with approximately equivalent results.

While what has been described is considered to be the more advantageous embodiments of the invention, it is obvious that many modifications and variations can be made in the compositions and specific procedures discussed without departing from the spirit and scope of the present invention, as those skilled in the art will readily understand. Such modifications and variations are considered to be within the purview and scope of the invention as defined by the appended claims.

What is claimed is:

1. A foamable composition, curable to a substantially non-corrosive foam, comprising: a foamable resinous composition selected from the group consisting of foamable phenol-aldehyde resoles which include a strong acid condensing agent and foamable chlorinated diphenyl oxides which release a strong mineral acid upon cure, curable at an elevated temperature to a cured foam containing a strong residual acid, said acid imparting to the cured foam a pH less than 4.5 and imparting corrosive properties to the cured foam, and a particulate coated ingredient comprising (a) a neutralizing material selected from the group consisting of the hydroxides, carbonates, and oxides of alkali metals, magnesium, calcium, barium, strontium, antimony, silver, zinc, mercury, iron and lead, and in an amount sufficient for substantially complete neutralization of the residual acid, and to impart to the cured foam a pH from about 4.5 to about 11, and (b) a coating on the particulate neutralizing material of a substance selected from the group consisting of oleic acid, coconut fatty acids, 2-ethylhexoic acid, stearic acid, benzoic acid, phthalic acid, maleic acid, oxalic acid, paraffin wax, bees wax, naphthalene, petroleum jelly, camphor, ozokerite, asphalt, pitch, carnauba wax and polyethylene oxide wax effectively encapsulating the neutralizing material and preventing reaction between the neutralizing material and the acid at temperatures below the elevated temperature at which a cured foam is produced, but ineffective to prevent such reaction at temperatures below those at which thermal decomposition of the foam occurs.

2. The composition of claim 1 wherein the resinous composition is a foamable phenol-aldehyde resole.

3. The composition of claim 2 wherein the neutralizing material is one which forms with the strong residual acid a salt having a solubility of less than 0.7 part of salt in 100 parts of water.

4. The composition of claim 3 wherein the neutralizing material is calcium oxide of −100 mesh size.

5. The composition of claim 2 which also includes, per 100 parts of the phenol-aldehyde resole, from 2 to 10 parts of a blowing agent effective to form a gaseous product at temperatures encountered during cure of the resole.

6. The composition of claim 5 which also includes from about 2 percent to about 10 percent, based upon the weight of the mixture of the acid condensing agent and the blowing agent, of a buffering agent selected from the group consisting of phosphoric acid, boric acid, phthalic acid, phosphates, borates and phthalates, which is reactive with the neutralizing material to form a weak acid salt as a pH buffering agent for the foam.

7. The composition of claim 6 wherein the neutralizing material is calcium oxide of −100 mesh.

References Cited in the file of this patent

UNITED STATES PATENTS

| | | |
|---|---|---|
| 2,653,139 | Sterling | Sept. 22, 1953 |
| 2,798,054 | Simon et al. | July 2, 1957 |